United States Patent [19]

Sagie et al.

[11] Patent Number: 5,107,513
[45] Date of Patent: Apr. 21, 1992

[54] HOLMIUM LASER

[75] Inventors: Dan Sagie, Chicago, Ill.; Yehoshua Kalisky, Metar, Israel; Jacob Kagan, Arad, Israel; Haim Lotem, Omer, Israel

[73] Assignee: The State of Israel, The Atomic Energy Commission, Negav, Israel

[21] Appl. No.: 451,422

[22] Filed: Dec. 15, 1989

[30] Foreign Application Priority Data

Dec. 19, 1988 [IL] Israel ................................. 88722

[51] Int. Cl.$^5$ ........................................... H01S 3/045
[52] U.S. Cl. ..................................................... 372/35
[58] Field of Search ..................................... 372/35, 72

[56] References Cited

U.S. PATENT DOCUMENTS

| | | | |
|---|---|---|---|
| 3,599,113 | 8/1971 | Cremosnik | 372/72 |
| 4,858,243 | 8/1989 | Bar-Joseph | 372/72 |

OTHER PUBLICATIONS

Kaplan, et al., "Basic Science: The Clinical Potential of the Holmium Laser": *Laser: In Medicine and Surgery*, 3:207-209 (1987).
K. Mori, "Transient Colour Centres Caused by UV Light Irradiation in Yttrium Aluminum Garnet Crystals," *Phys. Stat. Sol.*, A42:375 (1975).
Devor, et al., "Hydroxyl Impurity Effects in YAG ($Y_3Al_5O_{12}$)," *J. Chem. Phys.*, 81:4104 (1984).

Gettemy, et al., "Liquid Nitrogen Cooled Laser Rod Holder Design," *Rev. Sci. Instrum.*, 51 (9) (1980).
Chicklis, et al., "High-Efficiency Room-Temperature 2.06-$\mu$m Laser Using Sensitized $Ho^{3+}$: YLF," *Appl. Phys. Lett.*, 19:119 (1971).
Johnson, et al., "Coherent Oscillations from $Tm^{3+}$, $Ho^{3+}$, $Yb^{3+}$ and $Er^{3+}$ Ions in Yttrium Aluminum Garnet," *Appl. Phys. Lett.*, 7:127 (1965).
Johnson, et al., "Efficient, High-Power Coherent Emission from $Ho^{3+}$ Ions in Yttrium Aluminum Garnet, Assisted by Energy Transfer," *Appl. Phys. Lett.*, 8:200 (1966).
Johnson and Ingersoll, "Elimination of Degradation in the Laser Output from $Ho^{3+}$ in Sensitized YAG," *J. Appl. Phys.*, 44:5444 (1973).
Beck and Gurs, "Ho Laser with 50-W Output and 6.5% Slope Efficiency," *J. Appl. Phys.*, 46:5225 (1975).

*Primary Examiner*—James W. Davie
*Attorney, Agent, or Firm*—Hamilton, Brook, Smith & Reynolds

[57] ABSTRACT

A solid state holmium laser is described which comprises an elliptical or double-elliptical cavity in which pumping lamp(s) are located along one focal line of the ellipse(s) of a one piece cavity and a holmium laser rod is located along the other fold line of the ellipse(s). The laser rods are held by a rod holder and coupled to a source of coolant and a cooling mantle is provided on a cylindrical body forming the cavity.

18 Claims, 6 Drawing Sheets

HOLMIUM LASER

RELATED APPLICATIONS

This application corresponds to Israel Patent Application No. 88722 filed Dec. 19, 1988 and priority is claimed thereto.

BACKGROUND OF THE INVENTION

The technological field of the present invention is refrigerated lamp-pumped solid-state lasers. Lasers of this kind usually employ rare-earths crystals, for example a holmium crystals. The following description, while referring in particular to only holmium lasers, introduces the needs and technological objectives to be achieved by the laser apparatuses of the present invention.

Laser holmium emits radiation at about 2.06 μm, as a result of a transition between the $^5I_7 \rightarrow ^5I_8$ electronic levels. Laser emission results from optical pumping to higher energy levels belonging to energy donors (or sensitizers) and a transfer of the excitation energy to the activator lasing ion.

A significant advantage of the $Ho^{3+}$ for laser operation is the long lifetime of the emitting level $^5I_7$, which results in high energy storage capability and efficient Q-switched operation (Chicklis, E. P. et al., *Appl. Phys. Lett.*, 19:119 (1971)).

The first operation of the Ho:YAG laser with $Er^{3+}$ and $Tm^{3+}$ as sensitizers was reported by Johnson, et al. (ibid. 7:127 (1965); ibid. 8:200 (1966)). They obtained 7.6 W for 550 W of electrical input energy and calculated a total efficiency of about 5% by including geometric factors such as lamp and laser rod dimensions.

Beck and Gurs (*J. Appl. Phys.* 46: 5225 (1975)) reported output power of 50 W (slope efficiency of 5.6%) for Ho:YAG laser pumped in an elliptical cryogenically cooled cavity.

Early works in the field (Johnson, L. F. et al., *J. Appl. Phys.* 44: 5444 (1973); Mori, K. *Phys. Stat. Sol.* A42: 375 (1975); Devor, D. P. et al., *J. Chem. Phys.*, 81: 4104 (1984) reported on power degradation (solarization) effects in YAG, while similar effects were not seen in holmiun doped YLF. The degradation effects were associated with the UV part of the pumping source, which led to color centers formation. This type of degradation was partly eliminated by the use of appropriate filters (Johnson, L. F., *J. Appl. Phys.* 44 5444 (1973)). Part of the work was aimed at elucidating solarization effects.

Two main problems are associated with the operation of holmium lasers:

1) Laser transitions in $Ho^{3+}$ ion (as in other rare earth ions) are between f electronic levels. These are symmetry-forbidden transitions (Laport forbidden), having weak transition probabilities and oscillator strength of the order of $10^{-6}$.

2) The $Ho^{3+}$ laser at ambient temperature is a three-level system. The laser transition ends at the upper stark levels of the multiplet $^5I_8$. This multiplet is populated at room temperature; therefore, a population inversion and a resulting decrease in the output power of the laser is expected.

One way to overcome problems associated with the weak transitions of rare earths ions is the use of energy donors (or sensitizers) such as $Er^{3+}$ and $Tm^{3+}$, utilizing their ability to absorb part of the pumping energy and transfer it to the $Ho^{3+}$ ions.

The second problem requires a cryogenic cooling system for the laser rod. The cooling results in population of the lower stark splittings of the $^5I_8$ level, leaving the higher multiplets (which are the terminal levels of the laser transition) unpopulated.

For elliptical cavity lasers, the choice of a particular cavity configuration usually depends on geometric factors (size of the laser rods and pumping lamp), physical requirements (maximum laser efficiency versus maximum laser uniformity) and on system considerations (cooling system, weight, compactness).

Another element which plays an important role in designing a cavity is the type of pumping source. Optical pumping is achieved by using a gas discharge lamp filled with xenon or krypton, or, alternatively, by a filament lamp, e.g. a standard tungsten-halogen filament lamp. The gas discharge lamp has sharp discrete emission lines, while the tungsten-halogen has a continuous spectrum typical of a black body radiating source. The continuous radiation originating from the tungsten-halogen pumping lamp yields significant portion which overlaps with the absorption spectra of $Ho^{3+}$, $Tm^{3+}$ and $Er^{3+}$, which results in high pumping efficiency.

Most of the prior art laser cavities of the kind of a highly polished and chromium-gold plated elliptical cylinder, as used for any solid state laser, are made of two corresponding half cavities, which are assembled to form the cavity. Such an arrangement is satisfactory when the inner volume of the cavity may be flooded with water for cooling purposes, which is generally done in case of laser rods operating at or near ambient temperatures. In case of laser rods operating at or near cryogenic temperatures, this is not possible since the laser rod must be thermally insulated from the pumping lamp by a vacuum space.

Therefore, when operating at or near cryogenic temperatures the cavity and the rod must each be cooled separately. Since the cavity cannot be flooded, each half ellipse should be cooled separately, necessitating a plurality of piping connections for the cooling medium, generally water, involving a plurality of welds or soldered connections which are apt to become leaky with use. A drawback always present with elliptical cavities assembled from two halves is the difficulty in making matching complementary halves, as it is not possible to cut a one piece cavity into two halves, owing to the inevitable loss of material in cutting.

An additional problem with cavities consisting of two halves is the difficulty in achieving a sufficiently smooth polished surface, as the separate polishing of the two halves by conventional mechanical means presents complications, additionally there are problems of sealing the two halves of the elliptical cavity and special arrangements are always required.

The laser rod holder has to be especially adapted for operation at very low temperatures (for example, under liquid nitrogen cooling), wherein a tight joint must be maintained between the circulating coolant and the surrounding vacuum and, additionally, provisions must be made to accomodate differential thermal expansion between the crystalline laser rod and the other construction materials. An additional requirement is to provide for flow conditions preventing bubble formation in the coolant flow, while maintaining turbulent flow conditions, thus providing for efficient cooling. In order to avoid stagnation in flow at some regions which may cause elevated temperatures in said regions it is mandatory to provide for smooth gradual transitions between different cross sections, therefore disassemblable connections comprising O-rings of different materials, including indium, are unsatisfactory. At the same time, there must be provisions for replacing the laser rod, without damaging the same. As will be shown hereafter, the laser rod holder of the claimed construction takes account of all the above requirements. These requirements have not been solved by prior art arrangements. The use of a thin walled copper tube for holding the laser rod and for relieving stresses originating from differential thermal expansion, and also the sealing of the rod to this copper tube is known from Liquid Nitrogen Cooled Laser Rod Holder Design, Gehemy, D. et al., *Rev. Sci. Instrum.* 51 (9), September 1980. However, the construction described in this publication involves disassemblable connections comprising O-rings, in particular of indium, and step transitions in the cooling liquid nitrogen flow, giving rise to the possibility of bubble formation, detrimental to an efficient cooling. Also the replacement of the laser rod is complicated.

USE OF LASERS IN SURGICAL PROCEDURES

The use of lasers in surgical procedures has gained rapid acceptance in a variety of medical disciplines. In general three types of lasers are in common use: carbon dioxide ($CO_2$), argon, and neodymium:YAG (Nd:YAG). The carbon dioxide laser, intensely absorbed by water, is an excellent surgical knife and vaporizer. Its penetration depth is about 0.03 mm in tissue. However, its absorption by water makes it ineffective for coagulating larger blood vessels. The penetration depth of the argon laser is 1 to 2 mm in most tissue. It is minimally absorbed by water, but is intensely absorbed by hemoglobin. It is especially effective in coagulating bleeding points or lesions involving many small superficial vessels, but is a poor vaporizer and has no cutting effect. The Nd:YAG laser is poorly absorbed by both hemoglobin and water. Therefore, it is most useful in penetrating a large volume of tissue, blood clots and in coagulating large bleeding vessels. FIG. 5 compares the transmission of several laser wavelengths in water which is the major absorbing constituent of biological tissues. FIG. 6 compares the transmission and absorption properties of typical biological tissues within the relevant spectral range.

The extraordinary benefits of lasers are not obtained without certain risks. Both the YAG and $CO_2$ lasers sometimes cause burns or perforation of surrounding tissue (especially the Nd:YAG ), and the argon laser is dangerous to the eyes. The $CO_2$ laser has good cutting properties, but is a poor photocoagulator and cannot be delivered by fiber optics. The Nd:YAG (CW) laser is a good coagulator, and the argon laser has good heating and photocoagulation properties, but practically speaking, neither can be used as a cutting instrument.

The ideal surgical laser should incorporate both good photocoagulating and cutting properties, be eye safe and be easy to deliver.

The holmium laser fits the requirements of the "ideal" system. It has good cutting capabilities and its coagulating effects are similar to those of the Nd:YAG laser. Its penetration depth is about 0.4 mm for most tissues. Its limited transmission in water minimizes the peripheral damage to tissue, typical of the Nd:YAG laser. Unlike the only medical laser that cuts ($CO_2$), it can also be delivered through a commercial anhydride quartz optical fiber, permitting the surgeon to perform non-surgical, bleeding free endoscopic treatments. This fiber optic delivery is particularly important, not only because there is still a statistical mortality rate from surgical procedures themselves, but also because it saves days of hospital care and a great deal of suffering and inconvenience to the patient. The holium laser inherent eye safety is an additional advantage.

SUMMARY OF THE INVENTION

The present invention is directed to a solid state refrigerated elliptical or double-elliptical cavity laser wherein a pumping lamp is situated along one focal line of the of the ellipse, respectively two pumping lamps are situated along the two focal lines of the double-ellipse, and a crystalline laser rod along the other focal line of the ellipse, respectively along the mutual focal line of the double-ellipse, the cavity having a highly polished and suitably plated inner elliptical surface, characterized in that the cavity is made from one piece and is provided with a cooling mantle on the outer surface of the cylindrical body forming the cavity.

The invention is further directed to a laser rod holder for laser rods operating at any refrigerating temperatures necessitating thermal insulation (up to cryogenic temperatures) and cooled by circulating cooling fluid, comprising two parts, said parts being assembled in a concentric configuration, the inner part comprising the laser rod, the ends of which being inserted in a thin-walled copper tube and sealed by a silicon rubber composition which is transparent and does not absorb radiation and which retains some elasticity at cryogenic temperatures, the other end of said thin-walled copper tube being welded to a stainless steel tube, the outer part comprising a transparent quartz tube, the part of which covering the laser rod forming a small clearance with the same, followed by a gradually conically widening section, this section followed by a cylindrical section of a larger diameter, the end of which is connected to a molybdenum transition tube, said molybdenum tube being connected to a stainless steel tube comprising expansion bellows and liquid nitrogen inlet and outlet connections and welded to an end flange; said two parts being so dimensioned that in the assembled state the end flanges of the inner part and the end flanges of the outer part are closely adjacent; the holder is assembled by a soft solder connecting said end of the inner part to the end flange of the outer part.

In a preferred embodiment the invention is directed to an apparatus for generating laser radiation comprising an elliptical cylindrical laser cavity wherein a pumping lamp is situated along one focal line of the cavity and a crystalline laser rod is situated along the other focal line, the cavity having a highly polished and suitably plated inner elliptical surface and a laser rod holder for laser rods operating refrigerating temperatures (up to cryogenic temperatures and cooled by circulating liquid nitrogen wherein the laser cavity is characterized in that it is made from one piece and is provided with a cooling mantle on the outer surface of the cylindrical body forming the cavity and the laser rod holder is characterized in that it comprises two parts, said parts being assembled in a concentric configuration, the inner part comprising the laser rod, the ends of which being inserted in a thin-walled copper tube and sealed by a silicon rubber composition which is transparent and does not absorb radiation at cryogenic temperatures, the other end of said thin-walled copper tube being welded to a stainless steel tube, the outer part comprising a transparent quartz tube, the part of which covering the laser rod forming a small clearance with the same, followed by a gradually conically widening section, this section followed by a cylindrical section of a larger diameter, the end of which is connected to a molybdenum transition tube, said molybdenum tube being connected to a stainless steel tube comprising expansion bellows and liquid nitrogen inlet and outlet connections, said expansion bellows being welded to an end flange, said two parts being so dimensioned that in the assembled state the end of said end stainless steel tube of the inner part and the end flange of the outer part may be assembled by a soft solder connecting said end of the inner part to the end flange of the outer part.

The advantages of forming the cavity in one piece additional to the simplified cooling thereof, are that it may be easily and precisely machined for example by a Hy-cutter, without the need for providing special arrangements to make two exactly matching parts. The machined cavity may be mechanically polished to the required smoothness such as one micron rms, followed by chromium plating and re-polishing, for example also to one micron rms, and finally gold plated, the chromium and gold plating steps may be electrolytic or dielectric.

The gold plating has an additional advantage since it reflects only visible and IR light. UV radiation generated by the lamp is absorbed in the cavity and not reflected back to the laser rod, thus eliminating solarization.

As will be shown in description of the preferred embodiment, the cavity is cut from one block, in a form that the inner surface is the elliptical cavity proper, the outer surface is a circular cylinder, recessed in a manner that two flanges, integral with the body of the cavity, are left on both ends, the recessed middle part of the outer circular cylindrical surface, defining, together with a circular cylindrical surface welded on said flanges, a cooling mantle in which cooling water is circulated. Preferably there are only one entrance and one exit connections provided in the welded-on outer mantle and a partition forcing the cooling water to flow around the outer cylindrical surface on the cavity block provided in the cooling mantle. Preferably the clearance between the outer surface of the block and the welded-on mantle is small, providing efficient water cooling.

The approach of the present invention may also be applied to double-elliptical pump cavities, which are, per se, known in the art. In such double-elliptical cavities, two pumping lamps are situated each along one focal line of each ellipse and a crystalline laser rod is situated along the focal line mutual to the two ellipses. The double-elliptical cavity may also be cut from one block, polished in accordance with the polishing technique described for the elliptical cavity of the invention and fitted with a cooling mantle similar to that described in detail for the elliptical cavity of the invention.

The assembled cavity block is closed on both ends by closures having openings for mounting the pumping lamp or lamps and the laser rod holder, the pumping lamp being cooled by, for example, an air stream and the laser rod being cooled by, for example, circulating liquid nitrogen to a temperature of approximately 80° K. The end closures of the cavity block are not vacuum tight, and the complete assembly is enclosed by an outer housing, the whole assembly being evacuated. This arrangement confers the further advantage that the part of the connections for cooling air, cooling water and liquid nitrogen near to the cavity block need not be provided with heat insulation, thus saving space and providing for a more compact arrangement.

The arrangement of the present invention thus enables maintaining a vacuum in the internal elliptical space, providing for thermal insulation between the lamp, the laser rod and the cavity itself. Further, it is convenient to manufacture, avoiding the problems of adjustment associated with constructions made from two halves. The requirement for plurality of piping connections is eliminated, saving in production costs and increasing reliability, particularly vis-a-vis leakings, etc.

Since the laser rod is especially adapted for operation at cryogenic temperatures and under liquid nitrogen cooling, a tight-sealed joint must be maintained between the circulating liquid nitrogen coolant and the surrounding vaccuum. Additionally, provisions must be made to accomodate differential thermal expansion between the crystalline rod and the other construction materials. As will be seen in the DETAILED DESCRIPTION, the present arrangement answers the said requirements. The present holder assembly also provides for required flow conditions, as discussed above.

The present constructions is simple and robust, all connections, except two soft soldered ones being unitary and pre-fabricated. A prominent advantage of the present construction is that the soft soldered connections are in a region remote from the cooling region, at a location where the liquid nitrogen coolant is more or less stationary, and also that the laser rod unit may be replaced by unsoldering and re-soldering said soft soldered connections, without disturbing the liquid nitrogen connections, and also the new laser rod will occupy exactly the same position, without need for any adjustments. An additional advantage of the present construction is the transparency of the silicon rubber composition used to seal the laser rod/copper tube joint. While this joint is practically shielded from radiation from the pumping lamp, it nevertheless receives scattered radiation from the laser rod, and an absorption of radiation would cause heating of the sealing composition, resulting in accelerated deterioration. The silicone rubber composition is also inherently resistant to such deterioration.

The laser rod assembly of the present invention enables to operate through multiple and practically unlimited thermal cycles of about 230° C. In prior art arrangements the crystal endured a maximum of 30 cycles.

The laser of the present invention may be efficiently employed in a variety of uses. For example, solid state lasers according to the present invention may be used in a variety of surgical procedures and non-surgical endoscopic treatments. For such medical and surgical purposes, holmium lasers are preferred.

The invention is therefore also directed to methods of operating on patients by employing the laser of the present invention and to methods of endoscopic treatment of patients in need of such treatment by employing the laser of the present invention. The various medical applications will become clearer on hand of the following DETAILED DESCRIPTION and the EXAMPLES.

A wide range of surgical procedures which could not be performed with known devices may now be sucessfully performed with the holmium laser of the present invention. The holmium laser is also likely to replace the Nd:YAG laser in quite an impressive number of fields including gastro-enterology, general surgery, urology, vascular surgery, gall stones, bronchoscopy, gynecology, neurosurgery and cardiac surgery, due to its cutting properties it will be shown that the holmium laser can be safely and effectively used in non-surgical procedures by delivering the laser along a fiber optic through various kinds of catheters and endoscopes (cystoscope, gastroscope, etc.). Compared to the $CO_2$ laser, use of the holmium laser may control bleeding very effectively because of its superior coagulation properties.

The holmium laser comes closer to the "Ideal" than any other laser in use at this time. In addition to being a good cutting instrument, it is capable of coagulating both large vessels and the small superficial vessels in organs such as liver, kidney, spleen or lung. It is much safer than the other fiber delivered lasers due to its controlable tissue interaction, burns or perforations are avoided. Fiber optic delivery means that a full surgical procedure can be avoided if the site to be treated can be approached with a catheter. The present laser's inherent eye-safety is another sound advantage, especially for endoscopic treatments.

Experiments performed with the holmium laser of the present invention at low power have now shown that it can be an effective, commercially viable surgical instrument that combines the better features of other surgical lasers currently in use. This is supported by the following CLINICAL RESULTS.

DETAILED DESCRIPTION OF THE INVENTION

ELLIPTICAL CAVITY

Figure 1A:
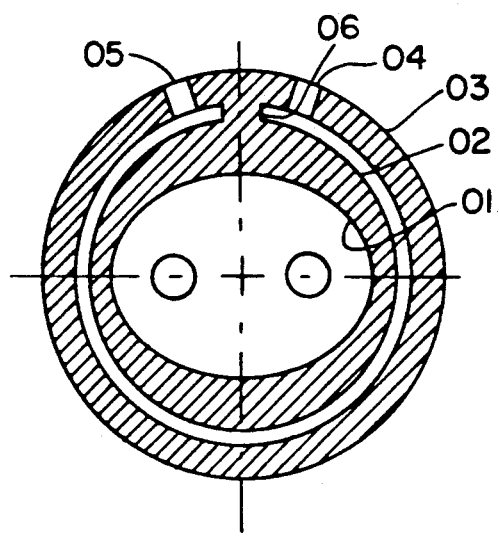
FIG. 1A represents a cross-sectional view of the elliptical cavity laser.
Figure 1B:
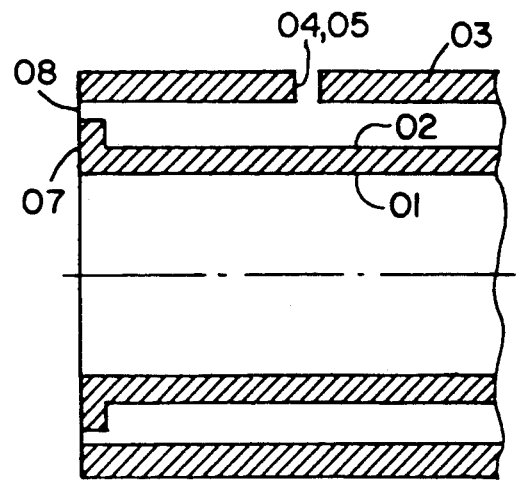
FIG. 1B represents a longitudinal section of the elliptical cavity laser.
Figure 1C:
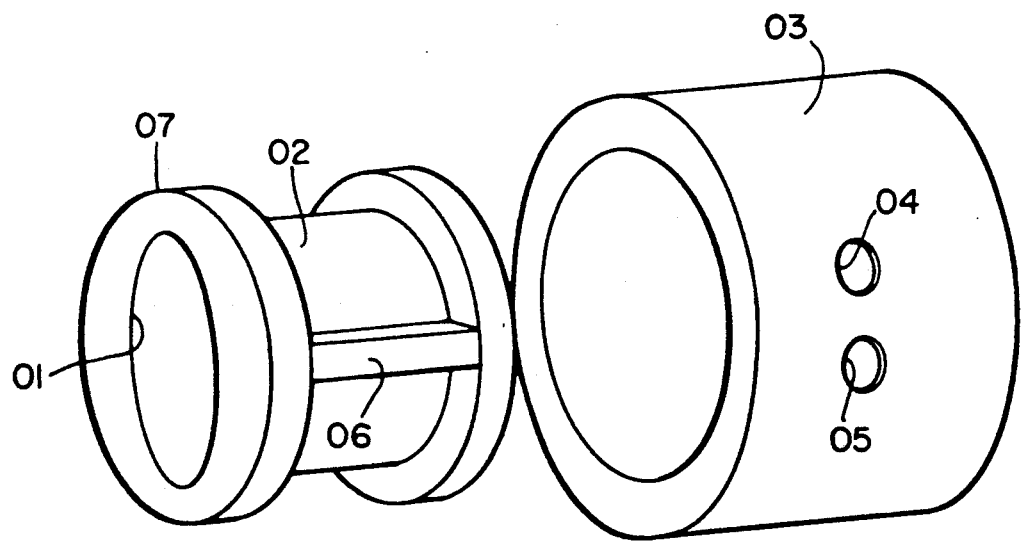
FIG. 1C represents an isometric exploded view of the elliptical cavity.

The elliptical laser cavity is illustrated in FIGS. 1A, 1B and 1C.

They represent a cross-section, a longitudinal section and an exploded isometric view respectively. These Figures illustrate only the cavity block assembly proper, for the sake of clarity (for the same reason, the reference numerals therein begin with the numeral 01).

Figure 2:
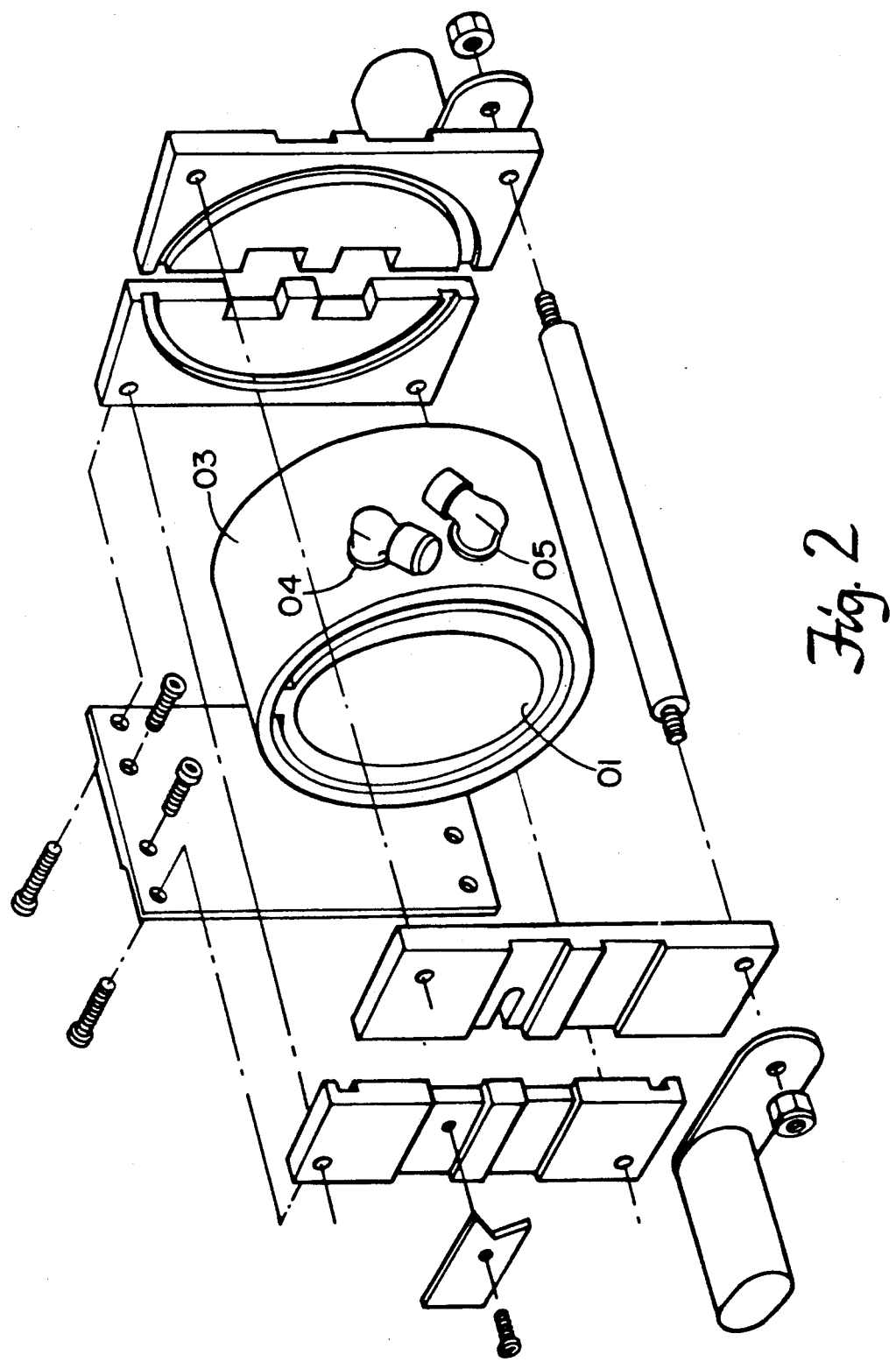
FIG. 2 represents an exploded view of the cavity block, laser rod holder, pumping lamp and air and nitrogen coolant connection assembly.
Figure 3:
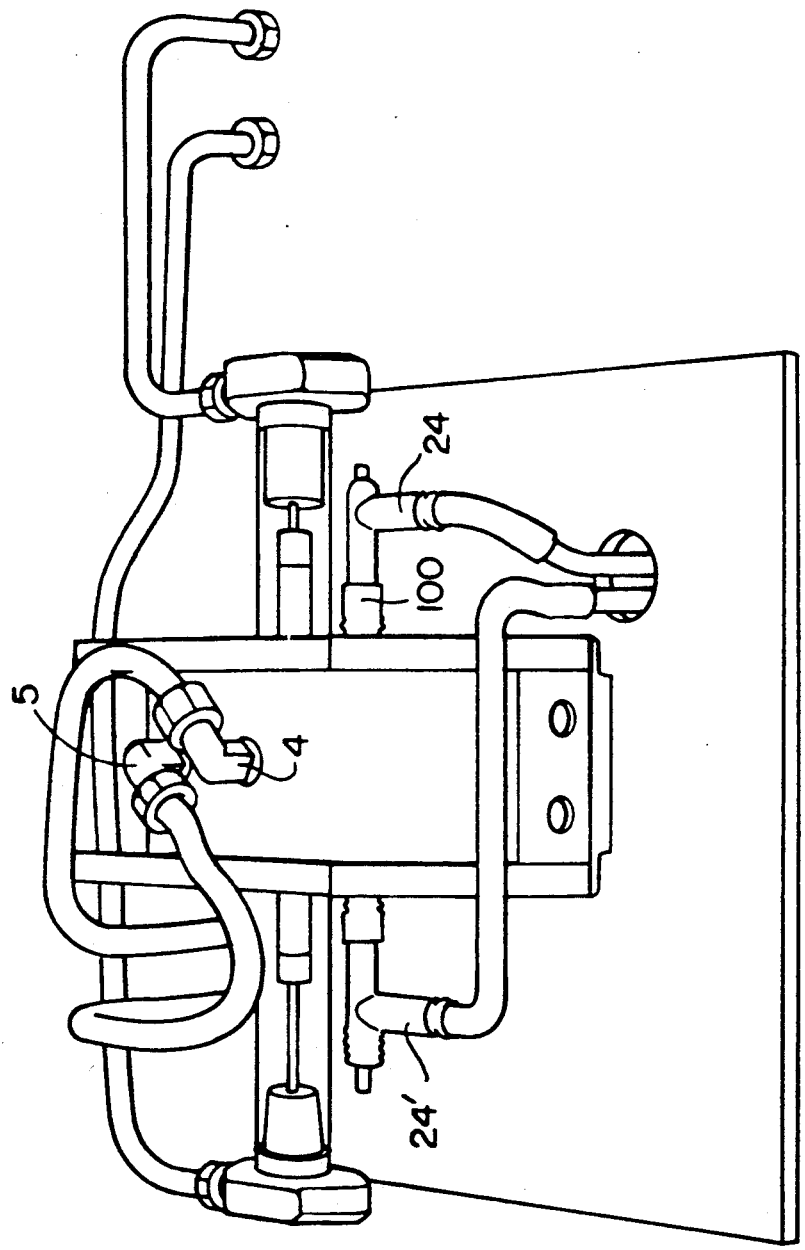
FIG. 3 represents a schematical view of the assembly of FIG. 2.

An exploded view of the complete assembly (cavity block, laser rod holder, pumping lamp, air and liquid nitrogen coolant connections) and an assembled schematical view of the same are illustrated FIGS. 2 and 3, respectively.

The cavity block proper is machined as an integral piece from one block. Referring to FIG. 1B, the cavity has an inner polished, and preferably chromium-gold plated elliptical surface 01 and an outer circular cylindrical surface 02, this may be more clearely seen in the cross-section (FIG. 1A) and two integrally formed flanges 07 (the cavity being symmetrical, only one half thereof is illustrated in the longitudinal section, FIG. 1C). Partition 06 is also integrally formed with the cavity block (FIGS. 1A and 1B), extending axially from one flange 07 to the other flange 07. This partition is situated between the inlet and outlet cooling water connections, and forces the cooling water to flow around the cylindrical surface and prevents short circuiting from inlet to outlet connections.

The second part of the assembled cavity is mantle 03, spaced from the outer cylindrical surface of the block proper by flanges 07, the cooling water circulates in the space between outer surface 02 and mantle 03. Mantle 03 is welded onto the flanges 07 at 08. The numerals 04 and 05 respectively indicate the openings in the mantle for the inlet and outlet cooling water connections. For mounting purposes marking indicating the ellipse axes may be provided on the flanges.

LASER ROD HOLDER

Figure 4:
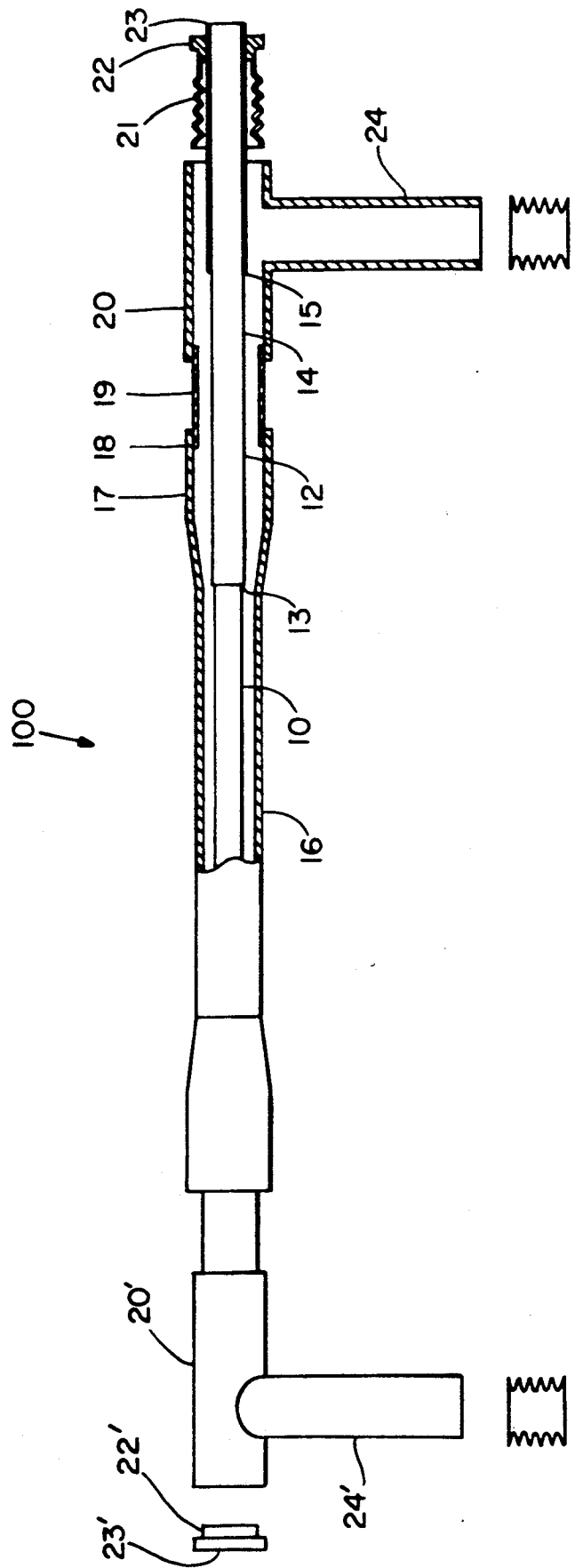
FIG. 4 represents the laser rod holder.
Figure 5:
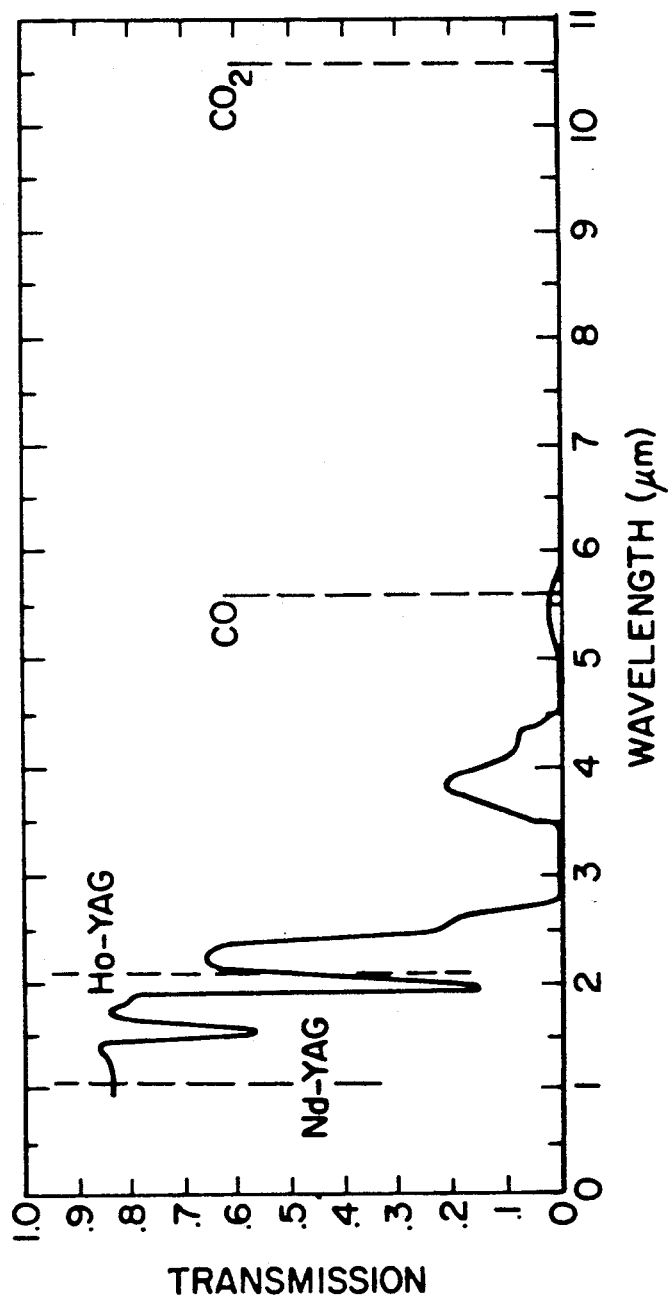
FIG. 5 represents the transmission of several laser wavelengths in water.
Figure 6:
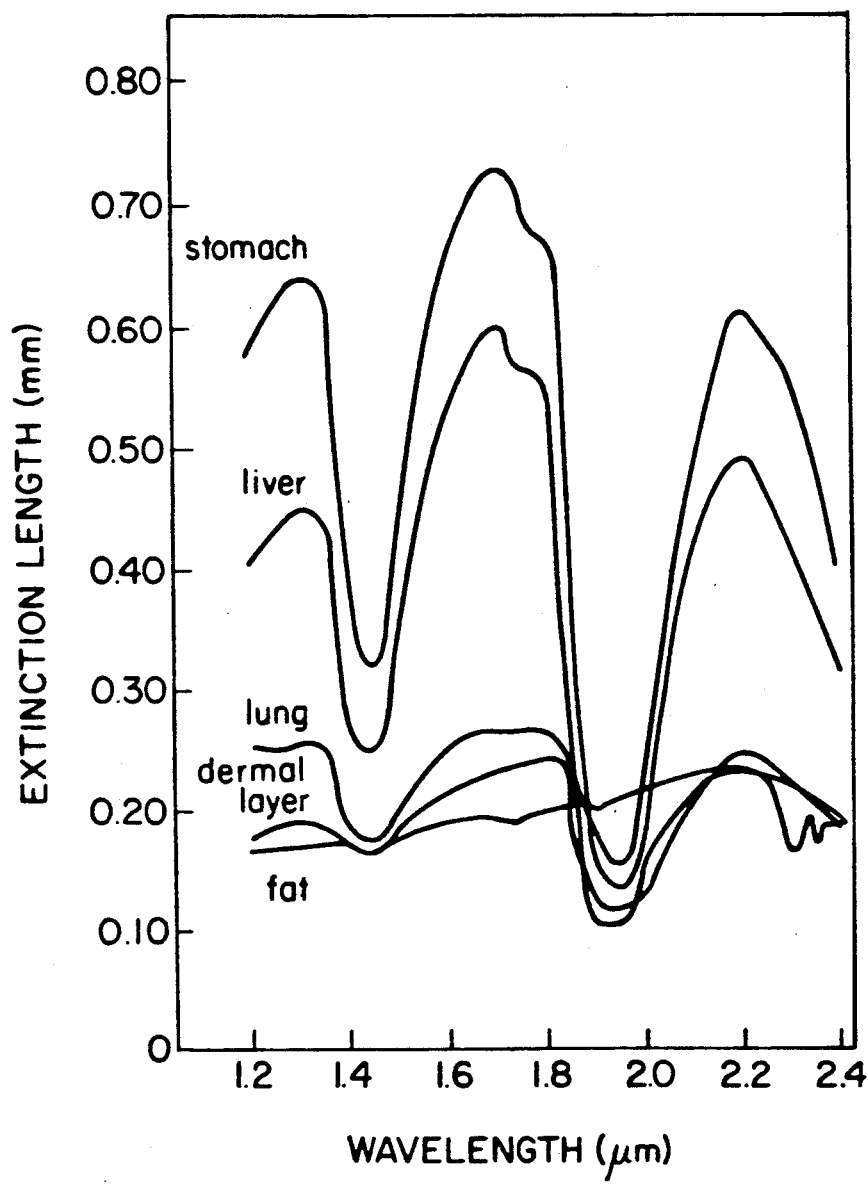
FIG. 6 represents spectral transmission of various biological tissues.

The laser rod holder is schematically illustrated in FIG. 4. This is an assembled view, partially broken away. The holder comprises two pre-assembled parts, one part being the laser rod holder proper and the second part being the cooling mantle in which the liquid nitrogen coolant is circulated. The two parts are assembled by soft, easily releasable soldering at two locations, said soldered connections being sufficiently tight to prevent escaping of the liquid nitrogen coolant into the surrounding evacuated space.

The first part is the laser rod holder assembly 100 proper. This part comprises the laser rod 10, the ends of which are inserted into a thin walled copper tube 12 which has a very thin end edge 13. The copper tube is capable of accomodating bending moments while the edge 13, together with a silicone rubber composition not shown, accomodate the radial stresses resulting from thermal expansion differences between the laser crystal and the other parts of the holder. Silicon rubber compositions which are transparent and retain some elasticity at cryogenic temperatures are particularly suitable for sealing the joint between the laser crystal and edge 13 of copper tube 12. The copper tube 12 is hard soldered at 14 to a stainless steel tube 15.

The second part is the cooling mantle assembly. This comprises a transparent quartz tube 16, 17, the part 16 of which, where the cooling effect proper takes place, has a small clearance with the laser rod 10 in order to provide for high velocity flow of the liquid nitrogen coolant for efficient cooling, part 17 of this quartz tube has a larger diameter and a gradual transition is provided between this larger diameter part 17 and part 16, in order to provide for smooth flow conditions in the liquid nitrogen circulation, avoiding stagnant regions in the nitrogen flow, where overheating may occur, causing bubble formation, detrimental to efficient cooling and also light scattering, detracting from overall efficiency.

Since the connections of the cooling mantle assembly to the liquid nitrogen lines must be, by necessity, of metal, said quartz tube 16, 17 is connected at 8 to a molybdenum piece 19, which is in turn connected to a stainless steel tube 20, in order to compensate for differences in radial expansion between the quartz and the stainless steel parts. Stainless steel tube 20 is connected to flange 22, via epxansion bellow 21 to compensate for thermal expansion longitudinal differences. Stainless steel tubes 20 and 20' have as integral parts thereof the liquid nitrogen inlet and outlet tubes 24 and 24' to which further conventional connecting parts are attached.

The laser holder assembly and the cooling mantle assembly are so dimensioned that in the assembled state the ends of stainless steel tube 15 protrude through the opening of flange 22 and the two parts of the laser holder assembly are semi-permanently connected by a releasable soft solder connection at 23, at the meeting of the flange 22 with the outer wall of stainless steel tube 15, as indicated. As stainless tube 15 forms a part of the laser holder proper and flange 22 forms a part of the cooling mantle assembly, it is clear that this soft releasable solder connection firmly but releasably combines the two assemblies and also provides for fluid-tight sealing of the liquid nitrogen flow. A suitable soft solder composition may be a bismuth-tin composition. Note that the soft soldered connections are in a region remote from the cooling region of the cooling mantle assembly, at a location where the liquid nitrogen coolant is substantially stationary.

The laser rod holder assembly may be exchanged or replaced, by releasing soft soldered connections 13 and 13' and pulling out the rod holder assembly in the axial direction, inserting the replacing assembly also axially and re-soldering, without interfering with the cooling assembly at all. As this outer cooling assembly also defines the position of the laser rod relative to the rest of the apparatus, the new laser rod will be exactly at the same relative position as the exchanged or replaced one.

As the two halves of the assembly are symmetrical except for bellows 11, only one half of the same (in broken away view) is described in detail.

CLINICAL RESULTS

Clinical Experiments Using the Holmium Laser

The laser beam is coupled to an anhydride quartz optical fiber (adapted to deliver $2\mu$), using special $\mu$ optics. The optical system is designed to facilitate accurate aiming at the target, using visible He-Ne beam also when the treating Ho beam is completely shut-off. Fibers of $200\mu$, $400\mu$ and $600\mu$ core diameter are standard, but fibers of other diameters may fit in, if desired.

The holmium laser may replace the Nd:YAG laser in a great number of applications in which the latter is used currently. The penetration depth of the holmium laser in typical tissue, a result of its wavelength (2.1 $\mu$m), lies between that of the Nd:YAG and the $CO_2$ lasers, both of which are already established modalities in surgery and medicine. Theoretically, therefore, the holmium laser is a better photocoagulator than the $CO_2$ laser and a better lightknife than the Nd:YAG laser. The amount of tissue damage caused by the holmium laser is comparable to that of the $CO_2$ laser. This means that the holmium laser can be expected to provide good cutting effect in situ while, at the same time, offering better control of depth of penetration and more rapid healing than the Nd:YAG laser.

1. The Holmium Laser in Gastroenterology

The holmium laser of the present invention may be efficiently used in the field of gastroenterology. Successful experiments have indicated that it will be particularly useful in the treatment of:

1) Bleeding ulcers of the gastrointestinal tract (GIT).
2) Excision of benign or malignant lesions of the GIT.
3) Recanalization in obstruction of the GIT.
4) Arresting massive bleeding in the GIT.

2. Holmium Laser Application in General Surgery

The unique character of the holmium laser as a fiber-delivered surgical and coagulation system has been amply demonstrated in experiments in the field of general surgery. Livers, spleens, pancreases and kidneys of dogs were cut without bleeding. Results are described and discussed in the following experiments.

(A) Preliminary experiments in general surgery were carried out on forty rats. Partial splenectomies or partial hepalectomies were performed using a 30 W holmium laser beam to cut out half of the spleen and half of the liver. There was no bleeding. The abdomen was then closed. After 2 or 4 weeks, the abdomen was opened again and a careful examination made. There was no post-operative mortality in an of the animals studied.

Following this period there was complete healing of the wounds in both spleen and liver, and microscopically, as well as macroscopically, a healthy cover of connective tissue was observed on the surface. There were no adhesions in the abdominal cavity and no delayed hemorrhage.

(B) In further experiments, the same procedures were performed on 10 dogs with quite similar results. In all the animals studied, the abdominal wall was opened using the holmium laser. There was no bleeding. The healing process of the abdominal wound was normal in all cases.

Spleen and liver were cut with a 30–50 W holmium laser beam. Within this range the results were almost identical. Cutting rates were between 0.2–1 cm/sec.

Only slight thermal damage was observed in the above experiments. This was not measured exactly; however, the thermal zone was a little wider than that seen when using a $CO_2$ laser.

The holmium laser is definitely a better coagulator than the $CO_2$. There is no bleeding with the Ho laser, while the $CO_2$ laser causes considerable bleeding. Vaporization is also much better with the Ho laser.

The cut surfaces of the treated organs were rough, and when the surface was rubbed there was no bleeding. When the same surgical procedure was performed with a $CO_2$ laser, bleeding resulted.

In view of the above, and considering the convenient delivery of the Ho laser light by fiber optics, it may be seen that the holmium laser has many advantages over the $CO_2$ laser in the field of general surgery.

3. The Holmium Laser in Urology

The holmiun laser can also be expected to replace the Nd;YAG laser in urology in the treatment of various pathalogical conditions of the bladder. The following experiments have been performed in two phases:

(A) Surgical Procedure: The bladder mucosa was exposed to the holmium laser at various exposure times and power levels and the effects studied. Microscopic examination of samples from the area treated showed that full and complete healing was achieved following these procedures.

(B) Non-Surgical Procedure: A cystoscope with a fiber optic was introduced to the bladder. The same experimental procedures as (A) were then followed.

4. Anastomoses of Blood Vessels

A new technique in vascular surgery is the use of a low power laser beam to create vascular anastomoses. A series of experiments has been performed in this field. Anastomosis of arteries and veins was created in dogs with a low power holmium laser beam. Some preliminary results were disclosed in Kaplan, I. et al, *Laser in Medicine and Surgery*, 3:207-209 (1987) incorporated herein by reference.

5. Occlusion of Blood Vessels

In these experiments the laser beam was used for the generation of a thrombosis in a large blood vessel. This might suggest a non-invasive procedure for various vascular anomalies such as aneurisms, patent ducts, varicose veins, haemangiomas, etc. Experimental studies on the vascular system are in their first stages and more investigations have to be made. Some of the intermediate results are in Kaplan, I. et al (ibid.)

6. Dissolution of Gall Bladder Stones

As a preliminary investigation, stones removed from a gall bladder following an operation were exposed to a holmium laser beam. Power of from 20-30 W was required to totally dissolve stones and convert them into vapour. Insertion of a fiber optic down into the common bile duct, so that the laser beam can be focused directly at a stone, may be developed using modern endoscopic equipment.

7. Holmium Laser Application in Bronchoscopy

Following publications in the medical literature concerning use of the Nd:YAG laser for treatment (recanalization) of obstructive tumors in the bronchial tree, the application of the holmium laser to these procedures was investigated. In preliminary studies, destruction of tumors was observed. These procedures are almost the same as those used for obstruction tumors in the gastrointestinal tract, and similar results are expected.

8. Holmium Laser Application in Gynecology

In order to verify the holmium laser application in this field the following studies were conducted: fallopian tube sterilization by tube shrinkage; reversal of this sterilization procedure using a welding technique; and intrauterine surgery of polyps, benign tumors and septum. On the basis of these experiments, safe and effective ablation of endometrium for memorhaghia can also be expected. Some of the work in this field is disclosed in Lachman, E. et al, 7th Congress of the International Society for Laser Surgery and Medicine, Munich, FRG, (1987), incorporated herein by reference.

9. Holmium Laser Application in Cardial Surgery

In addition to the work on blood vessels previously described some time was spent on the heart structure itself. The effect of the holmium laser on heart muscle, as well as heart septum and valves, was examined experimentally. It seems quite possible to treat an obstructive valve at several disease stages. Small holes artificially made in the septum were successfully closed by a low power beam.

Denaturation of arythmogenic foci for people who have survived sudden cardiac death and/or symptomatic ventricular tachycardia also seems to be feasible using fiber optics (via catheters) in a non-surgical procedure.

10. Holmium Laser Application in Neurosurgery $CO_2$ and Nd:YAG lasers are quite established now in neurosurgery. However, the Nd:YAG lacks cutting effect, while the $CO_2$ coagulates only small blood vessels and cannot be delivered through fiber optics. The simultaneous combination of coagulation and cutting effects introduced by the holmium laser, together with its unique fiber optics delivery capability, mean that the holmium laser should be very effective in neurosurgery. It can replace Nd:YAG and $CO_2$ for several procedures in the removal of solid, as well as vascular, tumors. Quite significant experience has been accumulated using appropriate laser power for control of bleeding in general, as well as at several specific bleeding rates. Direct experiments with brain tumors have not, as yet, been carried out.

I claim:

1. An apparatus for generating laser radiation comprising:
   an elliptical cylindrical laser cavity in which a pumping lamp is situated along one focal line of the ellipse and a crystalline laser rod along the other focal line of the ellipse said cavity having a highly polished and suitably plated inner elliptical surface and formed of integral one piece construction with an outer cylindrical surface, and a cooling mantle concentric with said outer cylindrical surface and forming in a space therebetween a cooling region for circulation of fluid to cool said cavity and a laser rod holder comprised of two parts, said parts being assembled in a concentric configuration, the inner part comprising the laser rod, each end of the rod of which being inserted in thin-walled copper tubes and sealed by a silicon rubber composition which is transparent and does not absorb radiation and which retains some elasticity at cryogenic temperatures, the other ends of said thin-walled copper tubes being welded to respective first and second stainless steel tubes, the outer part of the holder comprising a transparent quartz tube, the part of which covering the laser rod forming a small clearance with the same, followed on each end by a gradually conically widening section, this section followed by a cylindrical section of a larger diameter the ends of which are connected to respective molybdenum transition tubes, said molybdenum tubes being each connected to respective third and fourth stainless steel tubes a pair of expansion bellows and a liquid nitrogen inlet coupled to a side port on said third tube and a liquid nitrogen outlet connected to said fourth tube; end flanges on said respective third and fourth tubes with one of said bellows coupled to one end flange and another of said bellows coupled to the other end flange, said two parts being so dimensioned that in the assembled state the end of said stainless steel tube of the inner part and the end flange of the outer part may be assembled by soft solder connecting said end of the inner part to the end flange of the outer part.

2. The apparatus of claim 1 wherein aid cavity is gold-plated.

3. The apparatus of claim 1 wherein two mantle flanges are formed integral with the body of the cavity and the mantle comprises a cylindrical body welded on said flanges.

4. The apparatus of claim 3 wherein said outer cylindrical surface of the body of the cavity forms a small clearance with said welded-on cylindrical surface.

5. The apparatus of claim 4 wherein said cooling mantle has only one inlet and one outlet connections and a partition is formed in said cooling mantle between said inlet and said outlet connections.

6. The apparatus of claim 1 wherein said cavity is closed by two covers at the ends of the cylindrical body, said covers having openings for the laser rod holder, for the connections for said coolant and for air cooling said lamp.

7. The apparatus of claim 1 wherein the whole assembly is inserted in an evacuated outer housing, said connections for air and for coolant passing through the wandings of said outer housing and the parts of the coolant conduits and of the air conduits inside said evacuated outer housing being without a thermal insulating layer.

8. The apparatus of claim 1 wherein said end stainless steel tube of the inner part protrudes through the opening of the end flange of said outer part and the two parts are assembled by soft soldering between said flange and the outer wall of said stainless steel tube.

9. The apparatus of claim 1 wherein the two parts of the laser rod holder are soldered together at a location remote from the cooling mantle.

10. A laser rod holder for holding laser rods operating at refrigerating temperatures characterized in that it comprises two parts, said parts being assembled in a concentric configuration, the inner part comprising the laser rod, each end of which is inserted in first and second thin-walled copper tubes and sealed by a silicon rubber composition which his transparent and does not absorb radiation and which retains some elasticity at cryogenic temperatures, the other ends of said thin-walled copper tube being welded to respective first and second stainless steel tubes, the outer part comprising a transparent quartz tube, the part of which covering the laser rod forming a small clearance with the same, followed at each end of the quartz tube by gradually conically widening sections, these sections followed by cylindrical sections of a larger diameter the ends of which are connected to first and second molybdenum transition tubes, said molybdenum tubes being connected to respective third and fourth stainless steel tubes, an end flange on each third and fourth stainless steel tube and expansion bellows being welded to each end flange, said two parts being so dimensioned that in the assembled state each end of said first and second stainless steel tubes and the end flange of the outer part may be assembled by soft solder connecting said ends of the inner part to the end flanges of the outer part.

11. The laser rod holder of claim 10 wherein said end stainless tube of the inner part protrudes through the opening of the end flange of said outer part and the two parts are assembled by soft soldering between said flange and the outer wall of said stainless steel tube.

12. Apparatus comprising an elliptical laser cavity having an inner surface in the shape of an ellipse and an outer cylindrical surface in which a pumping lamp, is situated along a focal line of the ellipse, and a crystalline laser rod along the other focal line of the ellipse, said cavity formed of a hollow one piece metallic body, the inner surface of which forms a focussing elliptical laser cavity, the outer surface of which being an outer circular cylinder surface recessed such that two flanges integral with the body of the cavity are formed on both ends, with a recessed middle portion formed on the outer circular cylindrical surface; and a second cylindrical body having an inner circular cylindrical surface said second body being joined to said flanges whereby a liquid sealed recessed region is formed through which coolant may be circulated for cooling the cavity.

13. The apparatus of claim 12 wherein said cavity is gold-plated.

14. The apparatus of claim 12 wherein said outer cylindrical surface of the body of the cavity forms a small clearance with said inner cylindrical surface of the second body.

15. The apparatus of claim 14 wherein said inner and outer cylindrical surfaces form a cooling mantle which has only one inlet and one outlet and an integral partition is formed on aid cavity body between said inlet and said outlet and said partition extends transverse said flanges.

16. The apparatus of claim 12 wherein said cavity is closed by two covers mounted at the ends of the cylindrical body, said covers having openings for the laser rod holder, for the connections for liquid nitrogen conduits cooling the laser rod, and for the air conduits cooling the pumping lamp.

17. The apparatus of claim 15 wherein said cavity, assembled with the pumping lamp being cooled by air and the laser rod cooled with the coolant in the cooling mantle thereof, and is inserted in an evacuated outer housing having walls, with conduits for the air and for the coolant passing through the walls of said outer housing and wherein the conduits of the coolant and the air conduits inside said evacuated outer housing are without a thermal insulating layer.

18. A laser apparatus comprising an elliptical cylindrical laser cavity, in which a pumping lamp is situated along one focal line of an ellipse formed by the inner surface of said cavity and a crystalline laser rod along the other focal line of the ellipse, said cavity having a highly polished and suitably plated inner surface, and wherein the elliptical laser cavity is made of one piece metallic elliptical cylindrical cavity body and is provided with an integral cooling mantle on the outer surface of said body with a space therebetween for the circulation of cooling liquid.

* * * * *

UNITED STATES PATENT AND TRADEMARK OFFICE
CERTIFICATE OF CORRECTION

PATENT NO. : 5,107,513

DATED : Apr. 21, 1992

INVENTOR(S) : Dan Sagie, Yehoshua Kalisky, Jacob Kagan and Haim Lotem

It is certified that error appears in the above-identified patent and that said Letters Patent is hereby corrected as shown below:

Col. 13, line 35, delete "his" and insert ---is---.

Col. 14, line 29, delete "aid" and insert ---said---.

Signed and Sealed this

Twenty-ninth Day of June, 1993

Attest:

MICHAEL K. KIRK

*Attesting Officer*     *Acting Commissioner of Patents and Trademarks*